May 31, 1949.    J. H. PFAU    2,471,495
TOOTH POWDER DISPENSER
Filed Sept. 21, 1945

INVENTOR
JULIUS H. PFAU
BY
Alfred E. Page
ATTORNEY

Patented May 31, 1949

2,471,495

UNITED STATES PATENT OFFICE 2,471,495

TOOTH POWDER DISPENSER

Julius H. Pfau, Norristown, Pa.

Application September 21, 1945, Serial No. 617,836

15 Claims. (Cl. 222—127)

1

This invention relates to a dispenser, and more particularly to a novel tooth powder dispenser.

It is among the objects of this invention to provide a dispenser for powdered material in which discharge of the material is normally prevented; to provide a dispenser including a metering device adapted to be rotated by a material receiver to discharge metered amounts of material from a material container; to provide a simple, novel and inexpensive dispenser for tooth powder automatically placed in operative condition by engagement with a tooth brush; and to provide a tooth powder dispenser from which tooth powder is discharged upon a tooth brush as the latter is moved relative to a dispensing aperture in engagement with an operating member of the dispenser.

These and other objects, advantages and novel features of the invention will be apparent from the following description and the accompanying drawing. In the drawing.

Figure 1:
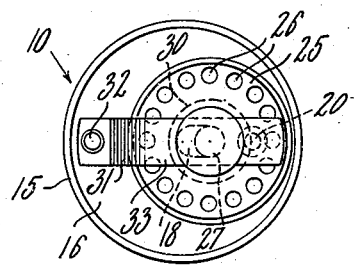
Fig. 1 is a top plan view of a dispenser constructed in accordance with the present invention, showing the dispenser in the inoperative position.

According to the present invention, a cylindrical container for powdered material is provided having an eccentrically located dispensing aperture in its lower end wall. An elongated radial slot is likewise formed in the wall and extends outwardly from the center of the wall toward the aperture. A metering member in the form of a circular plate is provided with a series of openings arranged in a circle having a diameter equal to the eccentricity of the metering aperture, and engages the inner side of the bottom wall of the container. A shaft secured to the metering member extends downwardly through the elongated slot and is provided with a roller of friction material on its lower end.

A resilient member, such as a leaf spring, is secured to a post in the container diametrically aligned with the dispensing aperture and to the metering member shaft, and normally biases the shaft to the outer end of the elongated slot so that the openings on the metering member are out of registry with the dispensing aperture. The leaf spring is extended to cover the openings in the metering member when the latter are registered with the dispensing aperture.

The eccentricity of the dispensing aperture is so determined than when the metering member shaft is in the inner end of the elongated slot, a tooth brush engaged with the friction roller will be disposed beneath the dispensing aperture to receive powder from the container through the metering member. The device is operated by pushing the tooth brush underneath the dispensing aperture in engagement with the friction member. This rotates the metering member to bring successive openings therein into registry with the dispensing aperture to discharge tooth powder or other material to the tooth brush or other material receiver.

Referring to the drawing, the dispenser 10 of the invention includes cylindrical container 15 having a lower end wall 16. End wall 16 is provided with an eccentrically located dispensing aperture 20 which may be in the form of a downwardly extending nozzle 17. Wall 16 is also formed with an elongated radial slot 18 extending outwardly toward aperture 20 from the center of the wall. For a purpose to be described, the post 21 is riveted to bottom wall 16 in diametric alignment with aperture 20, and extends upwardly into container 15.

The metering member comprises a circular plate or disk 25 formed with a plurality of openings 26 of substantially the same diameter as that of metering aperture 20. Openings 26 are arranged around the circumference of a circle whose radius is equal to the eccentric distance of metering aperture 20. A shaft 27 is secured for rotation with metering member 25 and extends downwardly through slot 18. A roller 30 of suitable friction material, such as hard rubber or the like, is secured on the lower end of shaft 27 for a purpose to be described.

Resilient means, such as a leaf spring 31, is secured at one end by a rivet 32 to the upper end of post 21, and curves downwardly, terminating in a flat portion 33 extending over the top of disk 25. Spring 31 is provided with an aperture 34 rotatably surrounding shaft 27. The flat portion 33 of spring 31 extends outwardly to adjacent the outer edge of metering disk 25. As post 21 is located diametrically opposite metering aperture 20, flat portion 33 of spring 31 covers openings 26 when in alignment with dispensing aperture 20.

Figure 2:
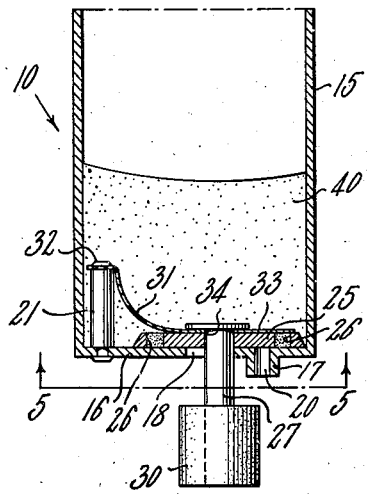
Fig. 2 is a vertical sectional view of the dispenser in the inoperative position.
Figure 5:
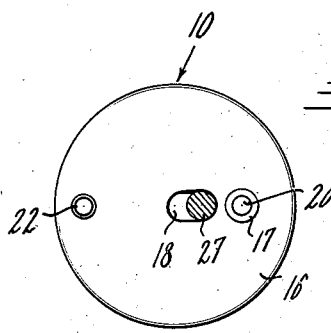
Fig. 5 is a view taken along the line 5—5 of Fig. 2, looking in the direction indicated by the arrows.

The operation of the described device is as follows. Normally, the parts occupy the position shown in Figs. 1, 2 and 5, with container 15 being filled with granular material, such as tooth powder 40, above metering member 25. The openings 26 which are not covered by spring 31, likewise contain powder 40. However, spring 31 biases shaft 27 to the outer end of slot 18 so that openings 26 are out of registry with dispensing aperture 20. At the same time, the particular opening 26 which is substantially radially aligned with aperture 20, is covered by the flat portion of spring 33.

Figure 3:
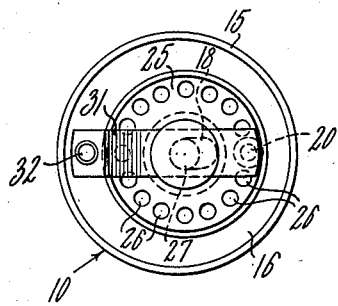
Fig. 3 is a view similar to Fig. 1 showing the dispenser in the operative position.
Figure 4:
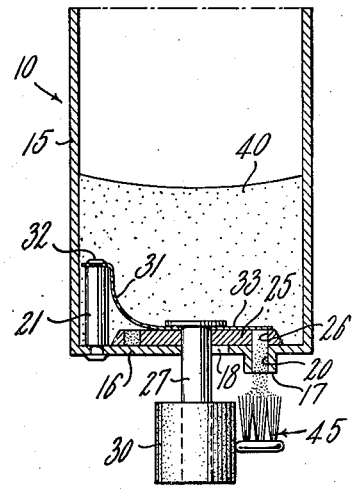
Fig. 4 is a view similar to Fig. 2 showing the dispenser in the operative position.

To place the device in operation, a tooth brush 45 is engaged with roller 30, as indicated in Fig. 4, and pressed against this roller to urge shaft 27 to the inner end of slot 18. This brings one of the openings 26 into registry with dispensing aperture 20, as shown in Figs. 3 and 4. Brush 45 is then drawn along roller 30 so that the roller is rotated and rotates metering disk 25. This brings successive openings 26 into alignment with dispensing aperture 20 so that powder 40 is discharged from such openings through the dispensing aperture on to brush 45. The portion 33 of spring 31 covering the opening 26 in registry with aperture 20 prevents a continuous discharge of powder on to brush 45, and provides instead a metered flow of powder on to the brush. As the openings 26 are moved outwardly beyond flat portion 33 of spring 31 they receive fresh quantities of powder 40 so that continual supply of powder is provided as long as roller 30 and thus metering disk 25 are rotated. When a sufficient amount of powder is on the brush, which is generally provided in one pass of the brush in engagement with roller 30, the brush is disengaged from roller 30 and spring 31 snaps metering member 25 back to the position shown in Figs. 1, 2 and 5, where further discharge of material 40 is prevented.

The described invention provides a simple and effective device for discharging metered amounts of a powdered material from a container into or on to a material receiver such as a tooth brush. When the device is not in use, the dispensing aperture is completely sealed. Additionally, during use of the device, only metered amounts of the material are discharged due to the flat spring portion 33 covering the metering opening along with the dispensing aperture.

While a specific embodiment of the invention has been shown and described in detail to illustrate the application of the principles thereof, it will be understood that the invention may be otherwise embodied without departing from such principles.

What is claimed is:

1. A dispenser comprising, in combination, a container adapted to contain the material to be dispensed, said container having a lower wall formed with a dispensing aperture and a slot extending toward the aperture; a metering member in said container engaging said lower wall and having openings adapted to receive the material to be dispensed; first means secured with said member and extending through the slot for engagement by a material receiver to bias said first means to one end of the slot to register the openings in said member with the dispensing aperture; and second means normally biasing said first means to the other end of the slot to move the openings in said member out of registry with the dispensing apertures.

2. A dispenser comprising, in combination, a container adapted to contain the material to be dispensed, said container having a lower wall formed with a dispensing aperture and a slot extending toward the aperture; a metering member in said container engaging said lower wall and having openings adapted to receive the material to be dispensed; first means secured with said member and extending through the slot for engagement by a material receiver to bias said first means to one end of the slot to register the openings in same member with the dispensing aperture; second means normally biasing said first means to the other end of the slot to move the openings in said member out of registry with the dispensing apertures; and means covering the openings when the latter are registered with the dispensing aperture to meter the material.

3. A dispenser comprising, in combination, a container adapted to contain the material to be dispensed, said container having a lower wall formed with a dispensing aperture and a slot extending toward the aperture; a metering member in said container engaging said lower wall and having openings adapted to receive the material to be dispensed; first means secured with said member and extending through the slot for engagement by a material receiver to bias said first means to one end of the slot to register the openings in said member with the dispensing aperture; and resilient means normally biasing said first means to the other end of the slot to move the openings in said member out of registry with the dispensing aperture.

4. A dispenser comprising, in combination, a container adapted to contain the material to be dispensed, said container having a lower wall formed with a dispensing aperture and an elongated substantially central slot; a metering member in said container engaging said lower wall and having openings adapted to receive the material to be dispensed; first means secured with said member and extending through the slot for engagement by a material receiver to bias said first means to one end of the slot to register the openings in said member with the dispensing aperture; resilient means normally biasing said first means to the other end of the slot to move the openings in said member out of registry with the dispensing aperture; and said resilient means covering the openings when the latter are registered with the dispensing aperture to meter the material.

5. A dispenser comprising, in combination, a container adapted to contain the material to be dispensed, said container having a lower wall formed with a dispensing aperture and an elongated substantially central slot; a metering member rotatably mounted adjacent said slot and having a plurality of openings arranged in a circle and adapted to receive the material to be dispensed; first means secured for rotation with said member and extending through the slot for engagement by a material receiver to rotate said member and simultaneously bias said first means to one end of the slot to register successive openings in said member with the dispensing aperture; and second means normally biasing said first means to the other end of the slot to move the openings in said member out of registry with the dispensing aperture.

6. A dispenser comprising, in combination, a container adapted to contain the material to be dispensed, said container having a lower wall formed with a dispensing aperture and an elongated substantially central slot; a metering member rotatably mounted adjacent said slot and having a plurality of openings arranged in a circle and adapted to receive the material to be dispensed; first means secured for rotation with said member and extending through the slot for engagement by a material receiver to rotate said member and simultaneously bias said first means to one end of the slot to register successive openings in said member with the dispensing aperture; second means normally biasing said first means to the other end of the slot to move the openings in said member out of registry with the dispensing aperture; and means covering the openings when the latter are registered with the dispensing aperture to meter the material.

7. A dispenser comprising, in combination, a container adapted to contain the material to be dispensed, said container having a lower wall formed with a dispensing aperture and an elongated substantially central slot; a metering member rotatably mounted adjacent said slot and having a plurality of openings arranged in a circle and adapted to receive the material to be dispensed; first means secured for rotation with said member and extending through the slot for engagement by a material receiver to rotate said member and simultaneously bias said first means to one end of the slot to register successive openings in said member with the dispensing aperture; resilient means normally biasing said first means to the other end of the slot to move the openings in said member out of registry with the dispensing aperture; and said resilient means covering the openings when the latter are registered with the dispensing aperture to meter the material.

8. A dispenser comprising, in combination, a container adapted to contain the material to be dispensed, said container having a lower wall formed with a dispensing aperture and an elongated substantially central slot; a metering member rotatably mounted adjacent said slot and having a plurality of openings arranged in a circle and adapted to receive the material to be dispensed; a shaft secured to said member and extending through the slot; a roller secured to the outer end of said shaft and engageable by a material receiver to rotate said member and simultaneously bias said shaft to one end of the slot to register successive openings in said member with the dispensing aperture; and means normally biasing said shaft to the other end of the slot to move the openings in said member out of registry with the dispensing aperture.

9. A dispenser comprising, in combination, a container adapted to contain the material to be dispensed, said container having a lower wall formed with a dispensing aperture and an elongated substantially central slot; a metering member rotatably mounted adjacent said slot and having a plurality of openings arranged in a circle and adapted to receive the material to be dispensed; a shaft secured to said member and extending through the slot; a roller secured to the outer end of said shaft and engageable by a material receiver to rotate said member and simultaneously bias said shaft to one end of the slot to register successive openings in said member with the dispensing aperture; means normally biasing said shaft to the other end of the slot to move the openings in said member out of registry with the dispensing aperture; and means covering the openings when the latter are registered with the dispensing aperture to meter the material.

10. A dispenser comprising, in combination, a container adapted to contain the material to be dispensed, said container having a lower wall formed with a dispensing aperture and an elongated substantially central slot; a metering member rotatably mounted adjacent said slot and having a plurality of openings arranged in a circle and adapted to receive the material to be dispensed; a shaft secured to said member and extending through the slot; a roller secured to the outer end of said shaft and engageable by a material receiver to rotate said member and simultaneously bias said shaft to one end of the slot to register successive openings in said member with the dispensing aperture; and resilient means normally biasing said shaft to the other end of the slot to move the openings in said member out of registry with the dispensing aperture; said resilient means covering the openings when the latter are registered with the dispensing aperture to meter the material.

11. A tooth powder dispenser comprising, in combination, a cylindrical container adapted to contain the tooth powder, said container having a lower end wall formed with an eccentrically disposed dispensing aperture and an elongated slot extending radially from the center of said end wall toward the dispensing aperture; a metering member rotatably mounted adjacent said slot and having a plurality of openings arranged in a circle having a radius equal to the eccentric distance of the dispensing aperture, the openings in said member being adapted to receive the tooth powder; first means secured for rotation with said member and extending through the slot for engagement by a tooth brush to rotate said member and simultaneously bias said first means to the inner end of the slot to register successive openings in said member with the dispensing aperture to meter tooth powder onto the tooth brush; and resilient means normally biasing said first means to the outer end of the slot to move the openings in said member out of registry with the dispensing aperture; the eccentric distance of the dispensing aperture being such that the tooth brush is aligned with such aperture when said first means is biased to the inner end of the slot.

12. A tooth powder dispenser comprising, in combination, a cylindrical container adapted to contain the tooth powder, said container having a lower end wall formed with an eccentrically disposed dispensing aperture and an elongated slot extending radially from the center of said end wall toward the dispensing aperture; a metering member rotatably mounted adjacent said slot and having a plurality of openings arranged in a circle having a radius equal to the eccentric distance of the dispensing aperture, the openings in said member being adapted to receive the tooth powder; first means secured for rotation with said member and extending through the slot for engagement by a tooth brush to rotate said member and simultaneously bias said first means to the inner end of the slot to register successive openings in said member with the dispensing aperture; resilient means normally biasing said first means to the outer end of the slot to move the openings in said member out of registry with the dispensing aperture; and means covering the openings when the latter are registered with the dispensing aperture to meter the tooth powder onto the tooth brush; the eccentric distance of the dispensing aperture being such that the tooth brush is aligned with such aperture when said first means is biased to the inner end of the slot.

13. A tooth powder dispenser comprising, in combination, a cylindrical container adapted to contain the tooth powder, said container having a lower end wall formed with an eccentrically disposed dispensing aperture and an elongated slot extending radially from the center of said end wall toward the dispensing aperture; a metering member rotatably mounted adjacent said slot and having a plurality of openings arranged in a circle having a radius equal to the eccentric distance of the dispensing aperture, the openings in said member being adapted to receive the tooth powder; first means secured for rotation with said member and extending through the slot for engagement by a tooth brush to rotate said member and simultaneously bias said first means to the inner end of the slot to register successive openings in said member with the dispensing aperture; and resilient means normally biasing said first means to the outer end of the slot to move the openings in said member out of registry with the dispensing aperture; said resilient means covering the openings when the latter are registered with the dispensing aperture to meter tooth powder onto the tooth brush; the eccentric distance of the dispensing aperture being such that the tooth brush is aligned with such aperture when said first means is biased to the inner end of the slot.

14. A tooth powder dispenser comprising, in combination, a cylindrical container adapted to contain the tooth powder, said container having a lower end wall formed with an eccentrically disposed dispensing aperture and an elongated slot extending radially from the center of said end wall toward the dispensing aperture; a metering disk in said container engaging said lower wall and having openings arranged in a circle having a radius equal to the eccentric distance of the dispensing aperture, the openings in said disk being adapted to receive the tooth powder; a shaft secured to said disk and extending through the slot; a roller secured to the lower end of said shaft; resilient means engaged with said end wall and said shaft and normally biasing said shaft to the outer end of the slot to move the openings in said disk out of registry with the dispensing aperture; said roller being engageable by a tooth brush to rotate said disk and simultaneously bias said shaft to the other end of the slot to register successive openings in said disk with the dispensing aperture; the eccentric distance of the dispensing aperture being such that the tooth brush is aligned with such aperture when said shaft is biased to the inner end of the slot; and means covering the openings when registered with the dispensing aperture to meter tooth powder onto the tooth brush.

15. A tooth powder dispenser comprising, in combination, a cylindrical container adapted to contain the tooth powder, and said container having a lower end wall formed with an eccentrically disposed dispensing aperture and an elongated slot extending radially from the center of said end wall toward the dispensing aperture; a metering disk in said container engaging said lower wall and having openings arranged in a circle having a radius equal to the eccentric distance of the dispensing aperture, the openings in said disk being adapted to receive the tooth powder; a shaft secured to said disk and extending through the slot; a roller secured to the lower end of said shaft; a post secured to said end wall diametrically opposite the dispensing aperture; a leaf spring secured to said post and formed with an aperture rotatably engaging said shaft, said spring extending beyond said shaft and covering the openings in said disk when diametrically aligned with the dispensing aperture; said spring biasing said shaft to the outer end of the slot to move the openings in said disk out of registry with the dispensing aperture; and said roller being engageable by a tooth brush to rotate said disk and simultaneously bias the shaft to the other end of the slot to register successive openings in said disk with the dispensing aperture to meter tooth powder onto the tooth brush; the eccentric distance of the dispensing aperture being such that the tooth brush is aligned with such aperture when said shaft is biased to the inner end of the slot.

JULIUS H. PFAU.

REFERENCES CITED

The following references are of record in the file of this patent:

UNITED STATES PATENTS

| Number | Name | Date |
|---|---|---|
| 1,885,979 | Bobrick | Nov. 1, 1932 |
| 2,048,670 | Berger | July 28, 1936 |